Figure 6:
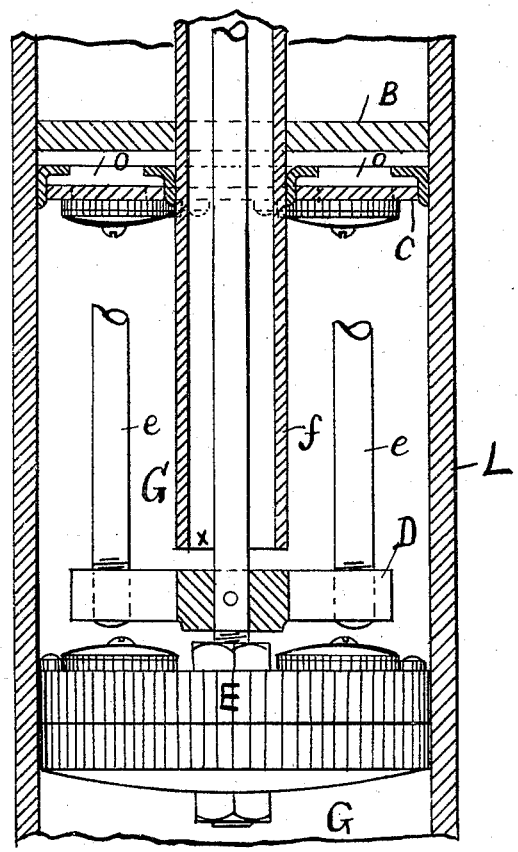

(No Model.) 2 Sheets—Sheet 1.
M. R. TURNER & R. G. KIRBY.
PUMP.
No. 544,801. Patented Aug. 20, 1895.
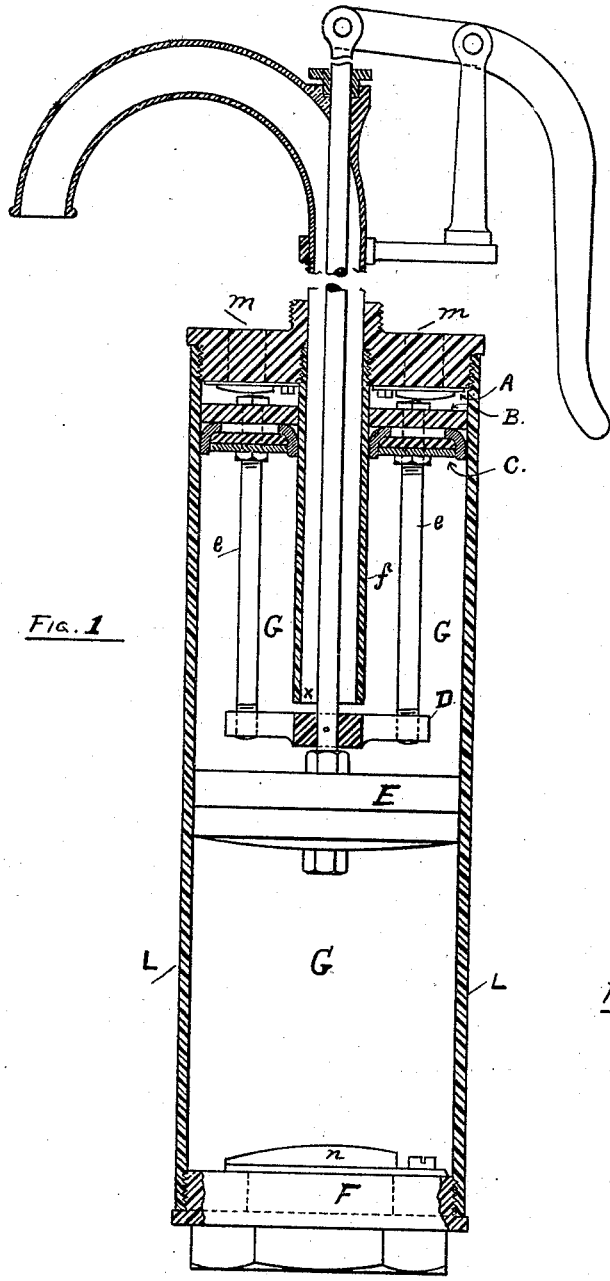
Fig. 1
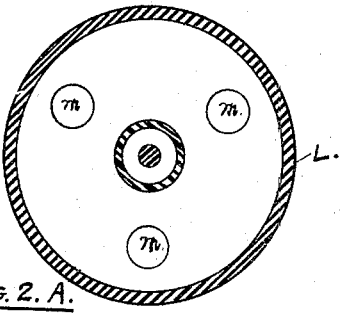
Fig. 2. A.
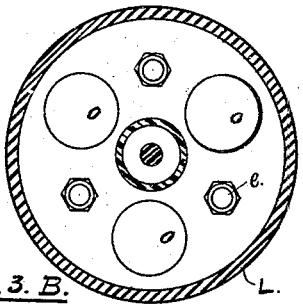
Fig. 3. B.
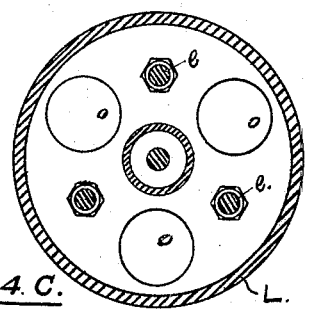
Fig. 4. C.
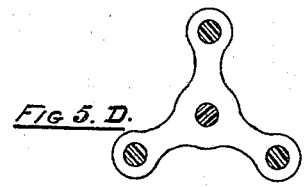
Fig. 5. D.
Witnesses:—
J. C. Barnes
C. V. Thurman
Inventors:—
Robert G. Kirby.
Moses R. Turner
per: Thurman & Silvius
Attorneys.

(No Model.) 2 Sheets—Sheet 2.
M. R. TURNER & R. G. KIRBY.
PUMP.

No. 544,801. Patented Aug. 20, 1895.

WITNESSES.
J. C. Barnes
C V Thurman

INVENTORS.
ROBERT C. KIRBY
MOSES R. TURNER.
By Thurman & Silvius
ATTORNEYS.

UNITED STATES PATENT OFFICE.

MOSES R. TURNER AND ROBERT G. KIRBY, OF ADAMS, INDIANA.

PUMP.

SPECIFICATION forming part of Letters Patent No. 544,801, dated August 20, 1895.

Application filed May 27, 1895. Serial No. 550,885. (No model.)

*To all whom it may concern:*

Be it known that we, MOSES R. TURNER and ROBERT G. KIRBY, citizens of the United States, residing at Adams, in the county of Decatur and State of Indiana, have invented certain new and useful Improvements in Pumps; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to improvements in pumps.

The object of our invention is to provide a pump which may be constructed of dimensions suitable for use in deep-piped or other wells, to produce a double action or continuous discharge with the least amount of force expended, and of simple and inexpensive manner of construction.

A further object is to provide a pump having a double-action principle contained in one cylinder capable of being operated when immersed in water or above the supply, as may be desired.

A still further object is to provide a double-action pump of cylindrical form having no projections on its outer sides, which may be lowered into a well having a pipe-casing to any depth required and be operated easily from the top of well.

We have aimed to make the subject of our invention of few parts and of such simple construction as to insure durability and economy in use and cheapness of construction.

With these objects in view the invention still further consists of certain novel details of construction and arrangement of parts, to be hereinafter more fully described, and pointed out in the claims.

Referring to the drawings accompanying, Figure 1 represents our invention in a vertical sectional view, with broken connection between pump and handle or lever. Fig. 2 is a plan of inside of upper cylinder head or cap A, showing walls of cylinder L and tube or inner chamber *f* in cross-section; Fig. 3, a plan of upper piston B and walls of cylinder L and tube *f* in cross-section; Fig. 4, a plan of piston plate or follower C and walls of cylinder L and tube *f* in cross-section, and Fig. 5 a plan of yoke or spider D. Fig. 6 is an enlarged half-sectional view of portion of cylinder, showing pistons and check-valves thereon.

In practical operation the cylinder is immersed, or pipes connecting at bottom near F and at top at *m m* have their lower ends immersed. In the position shown in Fig. 1 the piston E is at the upper extremity of its stroke, the lower portion of chamber G having been filled by suction through trap-valve *n* and retained there by same. The pistons E and B, connected together by means of the yoke D and rods *e e*, then descend, allowing the lower portion of chamber G to empty into the upper portion through suitable openings and trap-valves in packed piston E. This liquid, being unable to escape downward, forces that in the upper portion of cylinder to discharge through inner projecting tube *f* from its opening *x* upward and out of the pump. The same action of the pistons produces a suction by the packed piston B, which fills with liquid or air the upper portion of cylinder G through trap-valves *m m*, said valves holding it there from escape. Piston B has an opening in its center, through which the tube or inner chamber *f* passes and against which and outer walls L L it is packed by suitable cup-shaped leather packings similar to that in the piston, as generally used. The pistons now being at the lower extremity of their stroke they ascend, expelling the fluid through the opening at *x*, as before, while at the same time the fluid in the upper portion of G passes through the valve-openings *o* in piston B and is forced to be discharged, the same motion filling the lower portion of G and completing the stroke and double-action effect of the pump. (It is to be understood that this pump will work equally as well whether it takes water from one or both ends.)

It will be manifest to a skilled mechanic that details of construction may be variously modified within the limits of our invention without changing the mode of action.

Having thus described our invention, what we claim, and desire to secure by Letters Patent, is—

1. The combination of a pump, having a cylinder, two pistons connected, with valves in same so arranged as to prevent the escape of a fluid from between said pistons toward either end of cylinder; a projecting tube or inner chamber of cylinder permanently fixed and suspended from one head of cylinder; a packed piston having openings in its center to receive said tube, the whole being so constructed and arranged as to permit of same being submerged into the liquid to be pumped, substantially as shown.

2. In a pump having a vertical cylinder for drawing and discharging fluid, the combination of the receiving valves at each end of cylinder connected to the inside of heads thereof; the piston E, having suitable check valve upon its upper side, attached to an actuating piston rod; the annular piston B encircling tube $f$ and having suitable check valves upon its lower side, connected to piston E by suitable means; the yoke D centrally attached to the actuating piston-rod near piston E and connected to tie-rods $e\ e$; the tie-rods $e\ e$ connected at their lower ends to the yoke D and at their upper ends to the piston B; the follower C attached to piston B; and the discharge tube $f$, attached to and suspended from the inner side of the upper cylinder head A, said tube being finished smooth on its outer surface, permitting the packed annular piston B surrounding it to move along its length while being water tight; and an actuating piston-rod connected at its lower end with piston E and passing through tube $f$ to a connection at top of well for the purpose of receiving a reciprocating motion and power from a lever or motor, substantially as and for the purpose shown and described.

3. The combination, in a pump, of the cylinder L L having inlet valves at each end; the projecting inner tube $f$ secured to the inner side of upper cylinder head, and an annular packed valve piston surrounding and working over and around said tube; the pistons E and B, connected at a suitable distance apart by means of the yoke D and tie-rods $e$ and the whole to an actuating piston-rod passing through the said suspended inner tube, so that both of said pistons have a simultaneous motion, substantially as and for the purpose shown and described.

In testimony whereof we affix our signatures in presence of two witnesses.

MOSES R. TURNER.
ROBERT G. KIRBY.

Witnesses:
JNO. E. MULL,
A. WEHR.